G. B. AMBLER.
DETACHABLE RUNNER FOR VEHICLES.
APPLICATION FILED MAR. 17, 1911.
1,030,448.
Patented June 25, 1912.
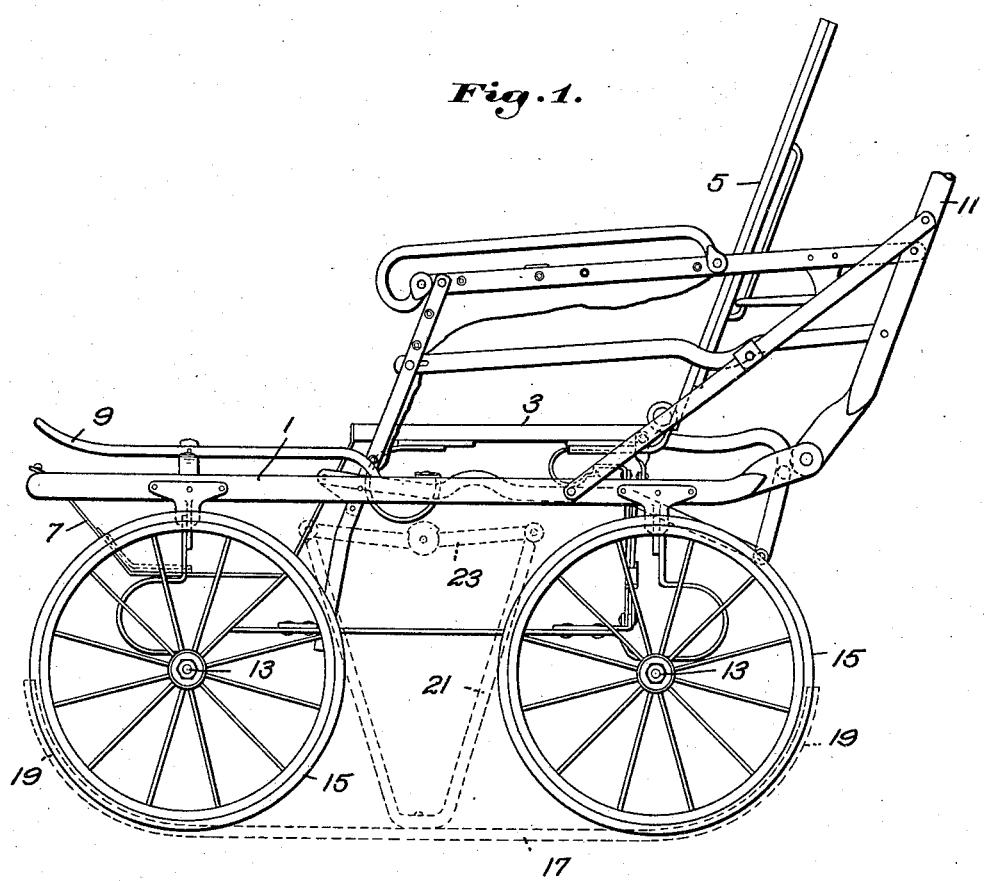
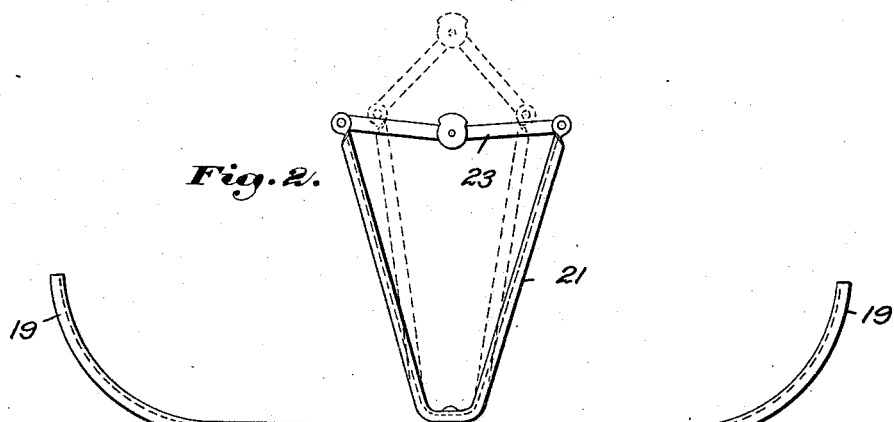
Witnesses:
Ernest A. Telfer
Robert H. Kammler
Inventor:
George B. Ambler
by Emery, Booth, Janney & Varney
Att'ys.

UNITED STATES PATENT OFFICE.

GEORGE B. AMBLER, OF LEOMINSTER, MASSACHUSETTS, ASSIGNOR TO F. A. WHITNEY CARRIAGE CO., OF LEOMINSTER, MASSACHUSETTS, A CORPORATION OF MASSACHUSETTS.

DETACHABLE RUNNER FOR VEHICLES.

1,030,448. Specification of Letters Patent. Patented June 25, 1912.

Original application filed April 8, 1909, Serial No. 488,562. Divided and this application filed March 17, 1911. Serial No. 615,033.

*To all whom it may concern:*

Be it known that I, GEORGE B. AMBLER, a citizen of the United States, and a resident of Leominster, in the county of Worcester and Commonwealth of Massachusetts, have invented an Improvement in Detachable Runners for Vehicles, of which the following description, in connection with the accompanying drawings, is a specification, like letters on the drawings representing like parts.

This invention relates to detachable runners for vehicles.

This application is a division from my co-pending application, Serial No. 488,562.

The character of the invention may be best understood by reference to the following description of an illustrative embodiment thereof shown in the accompanying drawing, wherein:

Figure 1 is a side elevation of a collapsible go-cart equipped with detachable runners embodying the invention; and Fig. 2 is a side elevation of the runner shown in Fig. 1 detached from the vehicle.

The go-cart shown in Fig. 1, illustrating the application of the detachable runner comprises a body frame 1 carrying a seat 3, back 5, foot rest 7, dash 9 and handle bars 11. The frame 1 is supported by a running gear including axles 13 and wheels 15. Said parts may be compactly collapsed in a manner not necessary to be described herein.

The illustrative detachable runner embodying the invention comprises a band 17 having at least one end and preferably both ends upturned as represented at 19—19, to embrace the rims of the wheels 15. As shown the upturned end or ends of the runner terminate beneath or at a point not extending above a line passing through the axles of the wheels 15—15. It is unnecessary and undesirable with the securing means employed to extend the end or ends of the runner above the point specified, and the application of the runner to the wheels is rendered more simple as the runner may be applied from below to the wheels.

In order to hold the runner in place I provide suitable clamping or wedging means such as a substantially V-shaped band 21 secured to the band 17 and the arms whereof are adapted to engage the adjacent parts of the wheels 15—15. Each arm of the band 21 and its related part 19 may by their own opposed elasticities engage diametrically opposite or other portions of the periphery of a wheel and strongly grip the same to hold the runner in place. To enhance this grip a toggle 23 may be interposed between the arms 21, the toggle serving to lock the same in gripping position when pressed downwardly as shown in full lines in Fig. 2. To release the grip of the parts 19 and 21 on the wheels it is merely necessary to pull or buckle the toggle 23 permitting the arms of the band 21 to assume the position shown in dotted lines in Fig. 2. The runner may then be removed from the wheels.

While the detachable runner is shown herein as applied to a collapsible go-cart, it will be understood that it may be readily applied to any type of vehicle.

It is to be understood that the above described illustrative embodiment of the invention may be variously changed and modified as will appear to those skilled in the art, within the proper scope of the invention, as it is defined in the sub-joined claims.

Claims.

1. A detachable runner apparatus for wheeled vehicles comprising, in combination, a runner strip having a straight runner portion to be positioned tangentially to a front and a rear wheel, and having also upturned ends constructed for peripheral engagement with a front portion of the front wheel and a rear portion of the rear wheel, said upturned ends terminating each below the horizontal plane of the axis of its corresponding wheel; an attached strip, bent in U shape, secured to said runner strip and having upright resilient legs to be interposed between the front and rear wheels and to engage the same peripherally at points above the horizontal planes of the wheel axles respectively; and a toggle interposed between said legs of the attaching strip for spreading the latter into clamping engagement with the wheels.

2. A detachable runner apparatus for wheeled vehicles comprising, in combination, a runner strip having a substantially straight runner portion to be positioned tangentially to a front and a rear wheel, and having upturned ends constructed for peripheral engagement with the front portion of the front wheel and the rear portion of the rear wheel; attaching means secured to the runner strip and having upright resilient legs to be interposed between the front and the rear wheels to engage the same respectively by peripheral contact, each said leg engaging one of the wheels in opposition to an upturned end of the runner strip; and a toggle interposed between said legs of the attaching means for spreading the latter into clamping engagement with the wheels.

In testimony whereof, I have signed my name to this specification, in the presence of two subscribing witnesses.

GEORGE B. AMBLER.

Witnesses:
 LENA N. WALKER,
 BELTINA G. HAWKINS.

Copies of this patent may be obtained for five cents each, by addressing the "Commissioner of Patents, Washington, D. C."